(12) United States Patent
Gvili

(10) Patent No.: US 8,627,762 B2
(45) Date of Patent: Jan. 14, 2014

(54) FRYING SYSTEM AND METHOD

(75) Inventor: Itzhak Gvili, Netanya (IL)

(73) Assignee: N.F.T.-Food Ltd., Zoran-Kadima (IL)

( * ) Notice: Subject to any disclaimer, the term of this patent is extended or adjusted under 35 U.S.C. 154(b) by 1281 days.

(21) Appl. No.: 11/628,042

(22) PCT Filed: Jun. 1, 2005

(86) PCT No.: PCT/IL2005/000565
§ 371 (c)(1),
(2), (4) Date: Nov. 30, 2006

(87) PCT Pub. No.: WO2005/117671
PCT Pub. Date: Dec. 15, 2005

(65) Prior Publication Data
US 2007/0240702 A1    Oct. 18, 2007

(30) Foreign Application Priority Data

Jun. 3, 2004 (IL) .......................................... 162352
Jan. 25, 2005 (IL) .......................................... 166479

(51) Int. Cl.
*A47J 37/12* (2006.01)

(52) U.S. Cl.
USPC .................. 99/330; 99/403; 99/407; 426/417

(58) Field of Classification Search
USPC ............ 99/403, 407, 330; 210/767, 805, 175, 210/181, 194, 195.1; 426/417
See application file for complete search history.

(56) References Cited

U.S. PATENT DOCUMENTS

| 3,417,220 | A |   | 12/1968 | Merchant |
| 3,688,683 | A | * | 9/1972 | Boggs et al. ..................... 99/330 |
| 4,457,947 | A | * | 7/1984 | Schmidt et al. ............... 426/438 |
| 4,873,920 | A | * | 10/1989 | Yang ............................... 99/409 |
| 4,962,698 | A | * | 10/1990 | Drijftholt et al. .............. 99/408 |
| 5,243,898 | A | * | 9/1993 | Sakuma .......................... 99/408 |
| 5,263,406 | A |   | 11/1993 | Chiu |
| 5,275,093 | A | * | 1/1994 | Chiu ............................... 99/408 |
| 5,317,964 | A |   | 6/1994 | Prudhomme |
| 6,820,536 | B2 | * | 11/2004 | Kijimoto ......................... 99/330 |
| 6,962,105 | B2 | * | 11/2005 | Saccardo ......................... 99/330 |

FOREIGN PATENT DOCUMENTS

FR     1.526.864     5/1968

* cited by examiner

*Primary Examiner* — Reginald L Alexander
(74) *Attorney, Agent, or Firm* — Aleya R. Champlin; Briggs and Morgan, P.A.

(57) ABSTRACT

A system and method for frying one or more food items. The system comprises a frying tank (2) having an open state in which the one or more food items may be introduced into the tank (2) and a closed state in which the interior chamber is hermetically sealed. A cooking oil delivery system (6) delivers cooking oil to the tank (2) so as to completely fill the tank with cooking oil. The method of the invention comprises Inserting one or more food items into the frying tank (2) and delivering cooking oil to the tank so as to completely fill the tank, and then frying the food items

19 Claims, 4 Drawing Sheets

FRYING SYSTEM AND METHOD

FIELD OF THE INVENTION

The present invention relates to methods and systems for cooking, and more specifically to such methods and systems for frying.

BACKGROUND OF THE INVENTION

Conventional frying processes are carried out with heated cooking oil, in which food items are immersed, exposed to air. This results in deterioration of the quality and appearance of the oil due to constant oxidation of the oil by air. The quality of the fried food may be spoiled by partially oxidized oil, and consumption of the fried food can pose a health hazard.

During the frying process, oil penetrates into the food items being fried. After the food items are removed from the oil, oil adhered to the surface of the fried items may be removed by shaking or centrifugation, or by subjecting the items to a hot air-jet. Removing cooking oil from the surface of the food items, however, leaves substantial amounts of oil in the interior of the food items. The oil present in the food items adds to the caloric content of the food items.

U.S. Pat. No. 5,263,406 to Chiu discloses a system for frying food in a frying tank that is partially filled with hot oil. Food items are introduced into thee frying tank above the oil. The frying tank is then hermetically sealed and air in the frying tank is removed to create a vacuum over the oil of about 60 torrs. The food items are then immersed in the hot oil. The frying oil is circulated in a closed system which maintains the temperature of the oil and filters the oil. After frying the fried food items are removed from the oil and shaken in the vacuum for deoiling.

SUMMARY OF THE INVENTION

In its first aspect, the present invention provides a method for frying food items with reduced oxidation of the cooking oil. In accordance with this aspect of the invention, food items are fried by hot cooking oil in a closed frying tank that is completely filled with oil and does not contain any air during the frying.

In its second aspect, the invention provides a method for deoiling fried food items. In accordance with this aspect of the invention, food items that were fried at a first pressure are subjected to a second pressure that is lower than the first pressure. For example, food items that were fried at atmospheric pressure may be inserted into a vacuum chamber and subjected to a vacuum that is lower than atmospheric pressure. Subjecting the fried food items to a pressure that is less than the frying pressure causes cooking oil in the interior of the of the items to be leeched out.

In its third aspect, the invention provides a system for frying food. The system includes a frying tank into which food to be fried are inserted. The frying tank is then hermetically sealed and pre-heated cooking oil is then delivered from an oil vat to the frying tank so as to expel all air from the frying tank and completely fill the frying tank with oil. After the interior chamber has been completely filled with oil, oil continues to circulate between the vat and the frying tank. The food items are preferably tossed during filling of the frying tank and during the subsequent frying. The food items are exposed to the hot circulating cooking oil for an amount of time necessary to satisfactorily fry the food items. When frying of the food items is completed, oil in the frying tank is removed. The fried food items are then removed from the frying tank. In a preferred embodiment, the cooking oil is confined to a close system after the frying tank has been filled with oil, so as to avoid exposure of the oil to air so as to prevent oxidation of the cooking oil and to prevent release of oil vapors and cooking odors into the air.

In its fourth aspect, the invention provides a system for frying food items and for deoiling food items after the frying. The system comprises a frying tank and a vacuum chamber. The frying tank may be an open frying tank in which case the food items to be fried are exposed to the atmosphere) during frying. Alternatively, the frying tank may be hermitically sealed during frying, in which case the frying is configured to be completely filled with cooking oil. The vacuum chamber includes a suction port from which air in the interior chamber of the vacuum chamber may be evacuated. The system preferably includes a vacuum pump and a hose or pipe connecting the vacuum pump to the suction port for evacuating the interior chamber of the frying tank. In a preferred embodiment, the frying tank also serves as the vacuum chamber.

Thus, in its first aspect, the invention provides a system for frying one or more food items, comprising:
 (a) a frying tank having an internal chamber configured to receive the one or more food items the frying tank having an open state in which the one or more food items may be introduced into the interior chamber or removed from the interior chamber, and a closed state in which the interior chamber is hermetically sealed; and
 (b) a cooking oil delivery system configured to deliver cooking oil to the interior chamber so as to completely fill the interior chamber with cooking oil.

In its second aspect, the invention provides a method for frying one or more food items, comprising:
 (a) Inserting the one or more food items into a frying tank having an internal chamber configured to receive the one or more food items, the frying tank having an open state in which the one or more food items may be introduced into the interior chamber or removed from the interior chamber, and a closed state in which the interior chamber is hermetically sealed;
 (b) delivering cooking oil to the interior chamber so as to completely fill the interior chamber with cooking oil; and
 (c) frying the one or more food items.

In its third aspect, the invention provides a method for deoiling food items fried at a first pressure comprising subjecting the fried food items to a second pressure that is less than the first pressure.

In its fourth aspect, the invention provides a system for frying food items comprising a frying tank and a vacuum chamber.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF PREFERRED EMBODIMENTS OF THE INVENTION

Figure 1:
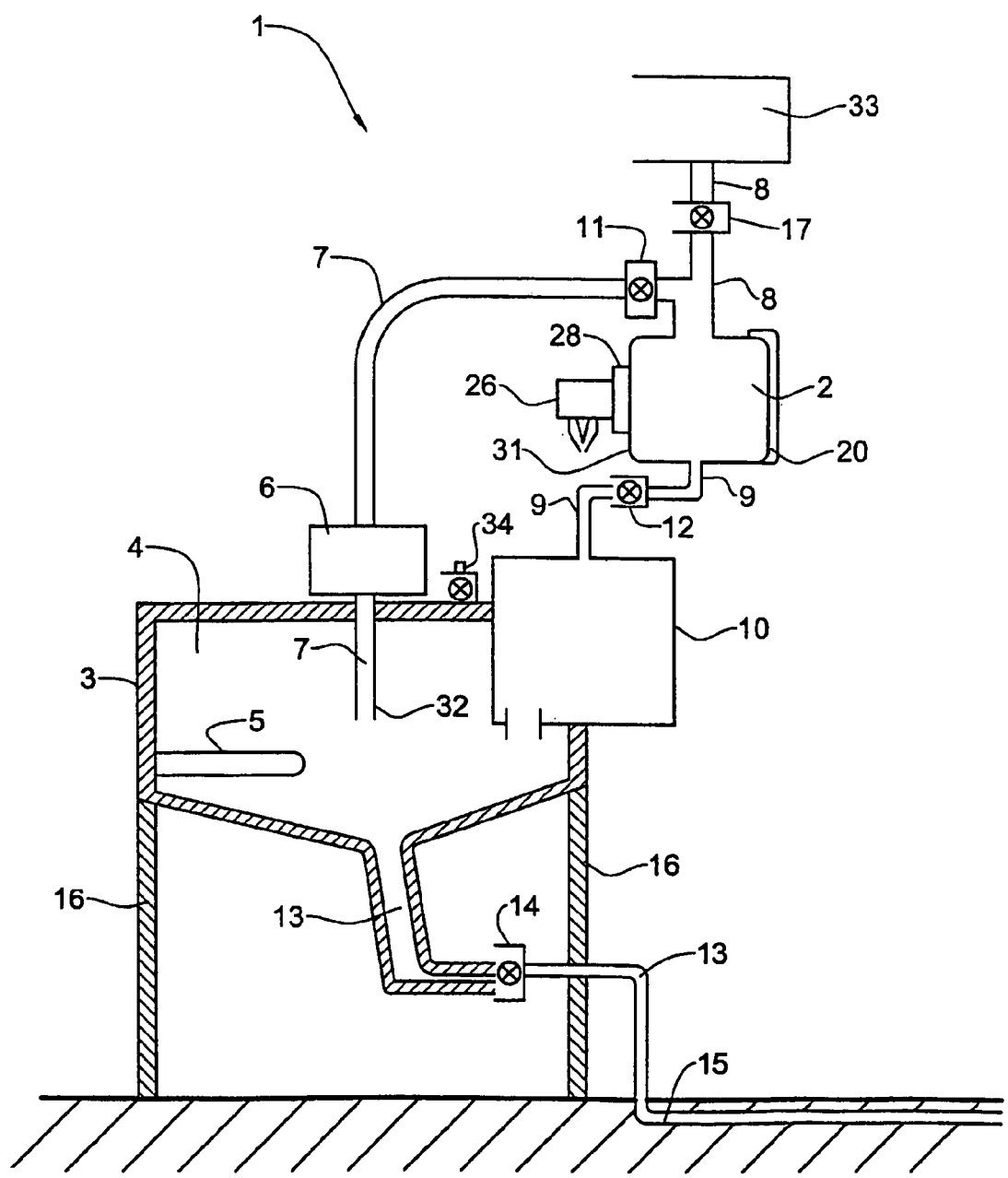
FIG. 1 shows a frying system in accordance with one embodiment of the invention.

FIG. 1 shows a frying system 1 in accordance with one embodiment of the invention. The system 1 includes a frying tank 2 into which food to be fried is inserted. The system also includes a vat 3 for heating cooking oil 4 by means of a heating element 5 inside the vat 3. The oil is preferably heated to around 130-180° C. The vat 3 may be supported by legs 16. Oil 4 is conducted from the vat 3 to the frying tank 2 and from the frying tank 2 to the vat 3 by means of an oil pump 6. Under the action of the oil pump 6, oil 4 is pumped out of the vat 3, and then passes through a segment of a pipe 7 to a pipe 8 before entering the the frying tank 2 through the top of the frying tank 2. Oil 4 leaves the frying tank 2 from the bottom of the frying tank 2 through a pipe 9, and then passes through oil filter 10 before returning to the vat 3. The pipes 7, 8, and 9 are preferably insulated so as to reduce cooling of the oil as it flows from the vat 3 to the frying tank 4 and back to the vat 3. The frying system 1 also includes a first oil valve 11 located on the pipe 7 and a second oil valve 12 located on the pipe 9. The vat 3 is provided with a drain pipe 13 having a valve 14. The valve 14 is normally closed. When it is desired to empty the vat 3 of cooking oil 4, the valve 14 is opened so as to allow the oil 4 in the vat 3 to flow under the influence of gravity into a drain pipe 15. The system 1 further comprises a vacuum pump 33 for removing air from the frying tank 2, as explained below. A vacuum valve 17 is located on the pipe 8 between the vacuum pump 33 and the pipe 8.

Figure 2:
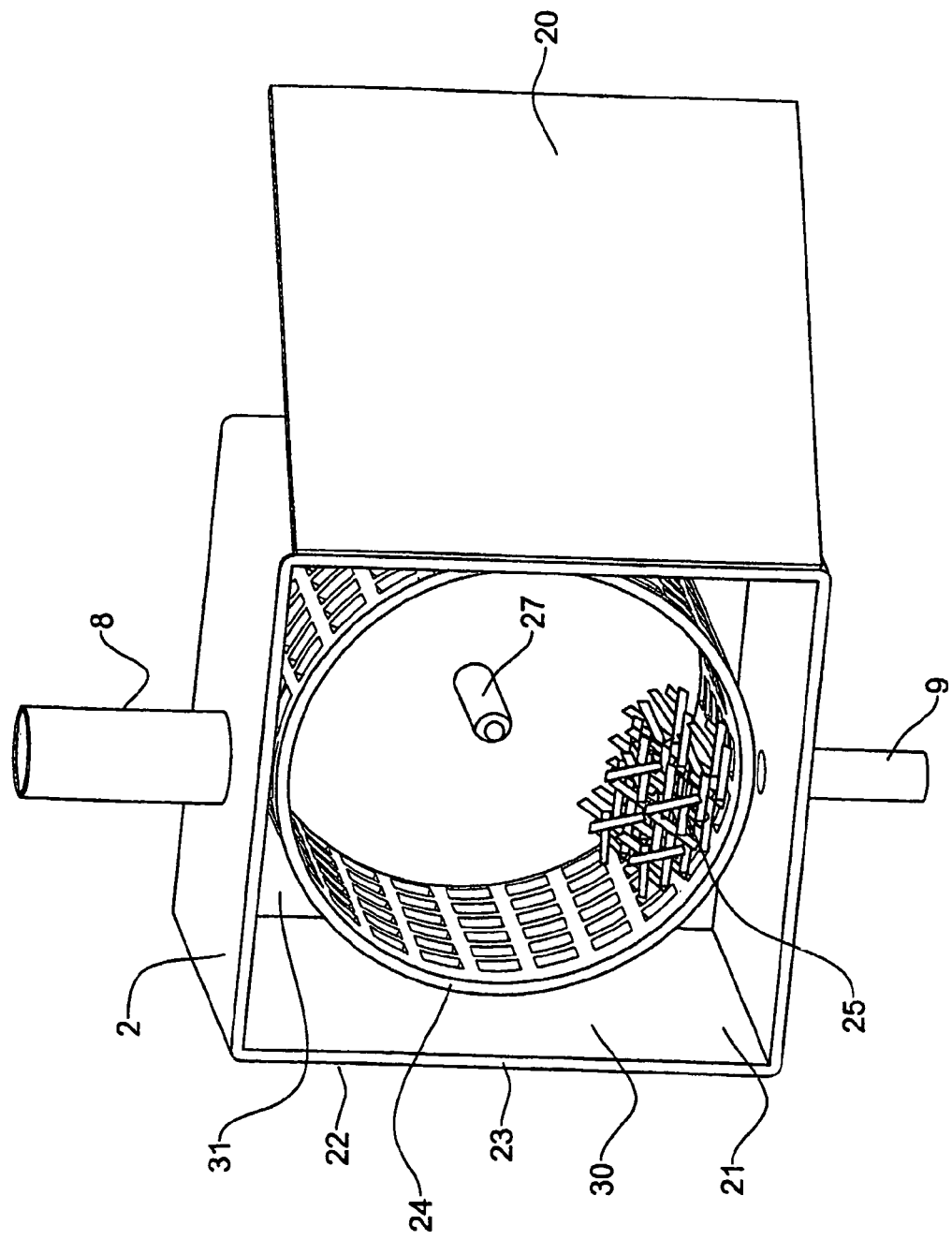
FIG. 2 shows the frying tank of the system of FIG. 1.

FIG. 2 shows the frying tank 2 in greater detail. The frying tank 2 is provided with a hinged side door 20. The door is shown in its open position in FIG. 2 so as to expose an interior flying chamber 21. In use, the door 20 is closed, as shown in FIG. 1. The frying chamber 21 includes a cylindrical frying drum 24 having a horizontal axis. The frying drum 24 is formed as a wire mesh basket, so that when the frying chamber 21 is filled with cooking oil 4, the oil contacts food items 25 located inside the frying drum 24.

In use, the door 20 of the frying tank 2 is opened with the interior chamber empty of cooking oil 4, and one or more food items 25 to be fried are placed in the frying drum 24. The door 20 is then closed. When the door 20 is closed, a hermetic seal is formed between the door 20 and the edge 22 of the frying chamber 21 by means of a sealing ring 23. With the valves 11 and 12 open and the valves 17 and 14 closed, the oil pump 6 is activated so as to cause pre-heated cooking oil 4 to flow from the vat 3 through the pipes 7 and 8 into the interior chamber 21 of the frying tank 2. The flow rate of the oil into the interior chamber under the influence of the oil pump 6 is adjusted to exceed the drainage rate from the interior chamber 21 via the pipe 9. The oil level in the interior chamber 21 thus rises as oil enters the interior chamber 21. As the level of the oil in the interior chamber 21 rises, air in the interior chamber 21 mixes with the oil and leaves the interior chamber 21 via the pipe 9 with oil. This process continues until all air initially present in the interior chamber 21 has been expelled from the interior chamber 21 and the interior chamber 21 is completely filled with oil. A valve 34 on the upper surface of the vat 3 allows any air arriving in the vat 3 to escape from the vat 3.

As the interior chamber 21 fills with oil, the frying drum 24 is made to rotate about its horizontal axis by means of an electric motor 26 located outside the frying tank 2 (FIG. 1). The motor 26 has a spindle 27 that passes through a back wall 31 of the frying tank opposite the door 20. An hermetic seal 28 between the spindle 27 and the wall of the frying tank 2 prevents oil from leaking out of the frying tank 2 around the spindle 27. The seal 28 also includes bearings in which the spindle rotates in the seal 28.

After the interior chamber 21 has been completely filled with oil and the air initially contained in the closed interior chamber 21 has been released through the valve 34, the valve 34 is closed. The cooking oil is then confined to a closed system which prevents avoids exposure of the oil to air so as to prevent oxidation of the oil and release of oil vapors and cooking odors into the environment. The cooking oil continues to circulate between the vat 3 (where the oil continues to be heated by the heating element 5) and the frying tank 2. The food items 25 are exposed to the hot circulating cooking oil 4 as the frying drum 24 continues to rotate for an amount of time necessary to satisfactorily fry the food items 25. When frying of the food items 25 is completed, the pumping action of the oil pump 6 is terminated. With the frying drum 24 continuing to rotate, the interior chamber 21 is emptied of cooking oil. This may be accomplished in one of two ways. In one way, the valve 11 is closed and the valve 17 is opened. Since the vacuum pump 33 is still off, opening the valve 17 vents the interior chamber 21 through the vacuum pump 33 so as to allow the oil in the interior chamber 21 to flow under the influence of gravity from the interior chamber 21 via the pipe 9 through the oil filter 10 and into the oil vat 3. In another way, the valve 12 is closed and the pumping action of the oil pump 6 is reversed so that oil in the interior chamber 21 returns to the vat 3 via the pipe 7 under the pumping action of the pump 6.

At this point, the valves 11 and 12 are closed, and the valve 17 remains opened. With the frying drum 24 continuing to rotate, the vacuum pump 33 is now activated which removes air from the interior chamber 21 causing excess oil to be leeched out of the fried food items 25, so as to deoil the fried food items 25. When deoiling is completed, operation of the vacuum pump 33 is terminated so as to vent the interior chamber 21 through the vacuum pump 33. The door 20 of the frying tank 2 is then opened and the fried food items are removed.

Figure 3:
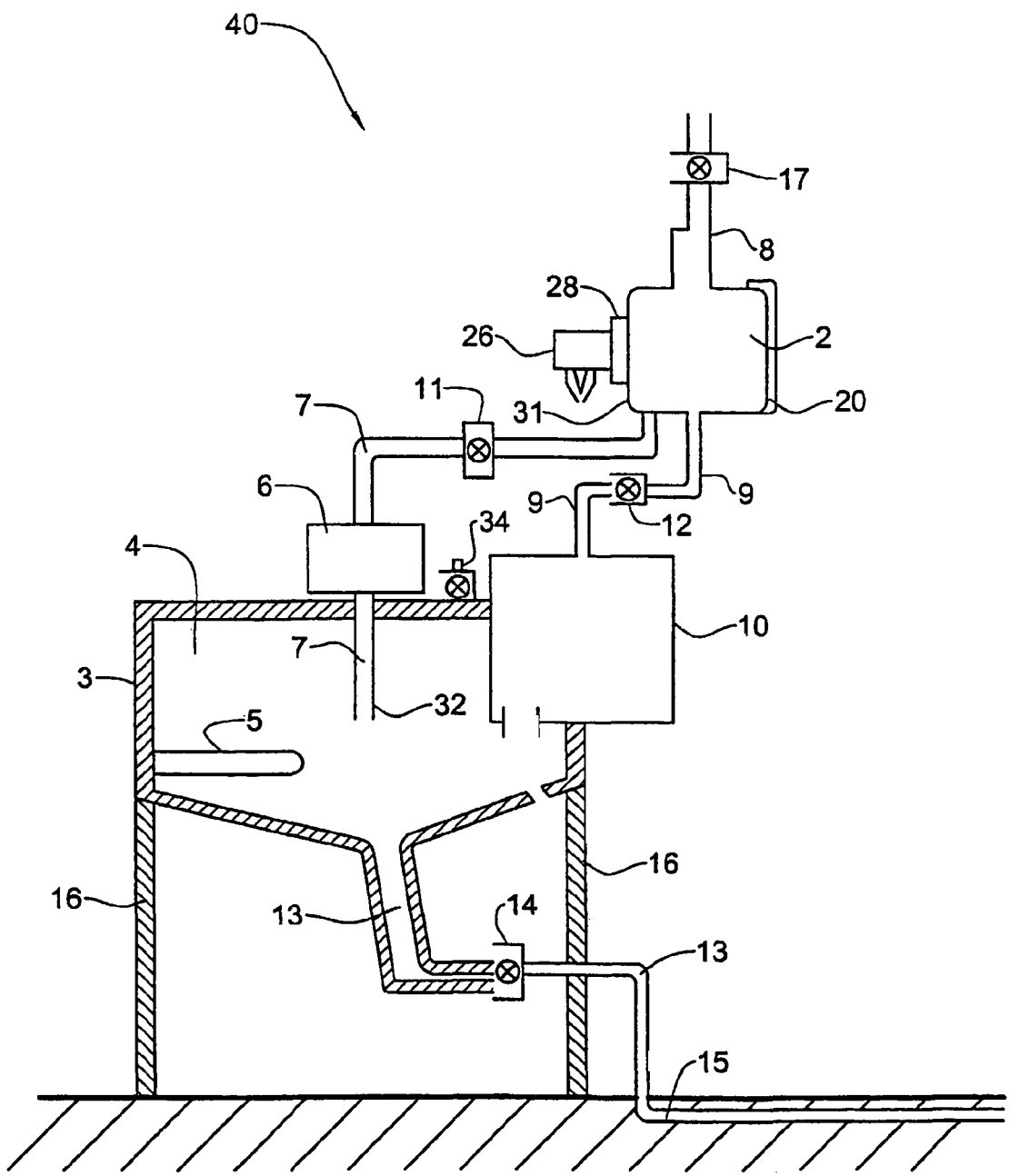
FIG. 3 shows a frying system in accordance with another embodiment of the invention in which oil is delivered and removed from the frying tank by the same pipe.

FIG. 3 shows a frying system 40 in accordance with another embodiment of the invention. Components of the frying system 40 in common with the frying system 1 shown in FIG. 1 are labeled with the same reference numeral used in FIG. 1 without further comment. The frying tank 2 in FIG. 3 has an interior chamber 21 similar to the interior chamber 21 of the system 1, including a cylindrical frying drum 24 in the form of a wire mesh basket. The frying system 40, does not include a vacuum pump. The oil pump 6 is used to introduce and removes cooking oil from the frying tank 2 via the pipe 7 which enters the frying tank 2 at the bottom of the tank.

As with the system 1, the door 20 of the frying tank 2 of system 40 is opened with the interior chamber empty of cooking oil 4, and one or more food items 25 to be fried are placed in the frying drum 24. The door 20 is then closed. When the door 20 is closed, a hermetic seal is formed between the door 20 and the edge 22 of the frying chamber 21 by means of a sealing ring 23. The interior chamber 21 is then filled with cooking oil. After the interior chamber 21 has been completely filled with oil and the air initially contained in the closed interior chamber 21 has been released through the valve 34, the valve 34 is closed. The cooking oil is then confined to a closed system which prevents avoids exposure of the oil to air so as to prevent oxidation of the oil and release of oil vapors and cooking odors into the environment. The food items 25 are then fried as explained above with reference to the system 1 of FIG. 1.

When frying of the food items 25 is completed, the interior chamber 21 is emptied of cooking oil. With the valves 17 and 12 closed and the valve 11 open, the pumping action of the oil pump 6 is reversed so that oil is pumped from the interior chamber 21 to the vat 3. Since the valves 17 and 12 are closed, as the pump 6 removes oil from the interior chamber 21, a vacuum forms in the interior chamber 21. Oil continues to be removed by the pumping action of the pump 6 until a desired vacuum is formed in the interior chamber around the fried food items 25. This causes excess oil to be leeched out of the fried food items 25, so as to deoil the fried food items 25. When deoiling is completed, the valve 17 is opened so as to vent the interior chamber 21. The door 20 of the frying tank 2 is then opened and the fried food items are removed.

The system 1 was used for frying potato pieces at a pressure of 1 atmosphere. The cooking oil was then removed from the interior chamber 21, and the fried potato pieces were deoiled by subjecting the potato pieces to a pressure of 0.4 atmospheres with rotation of the drum 24 for 30 seconds. The oil content of the fried potato pieces was determined before and after the deoiling step. It was found that 30%-40% of the oil present in the fried potato pieces before the deoiling step was removed by the deoiling.

Figure 4:
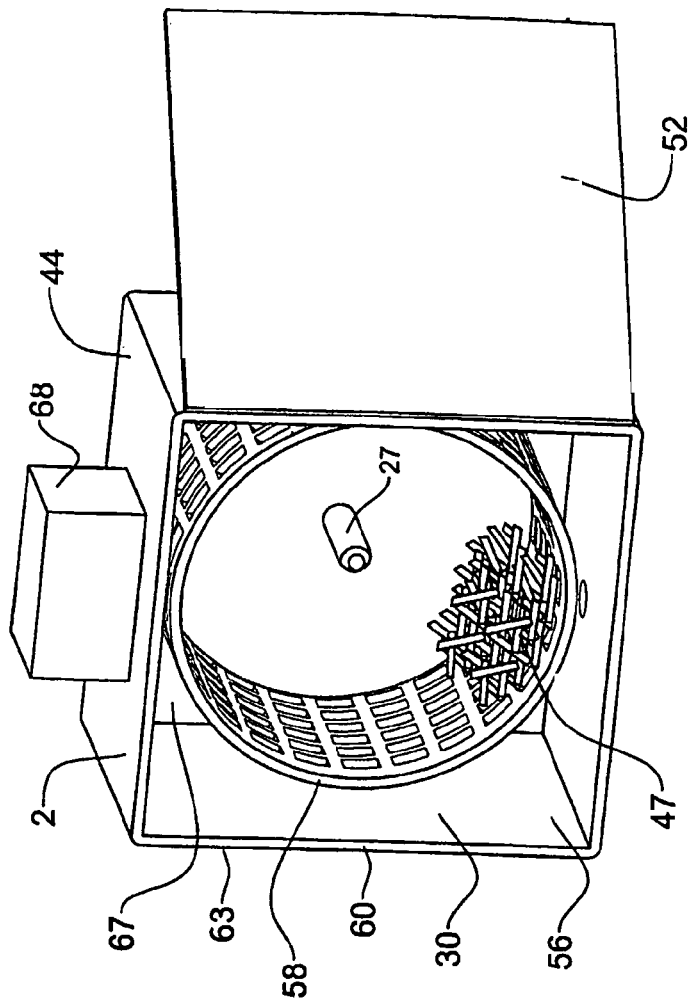
FIG. 4 shows a frying system in accordance with another embodiment of the invention having an open frying tank.
Figure 4:
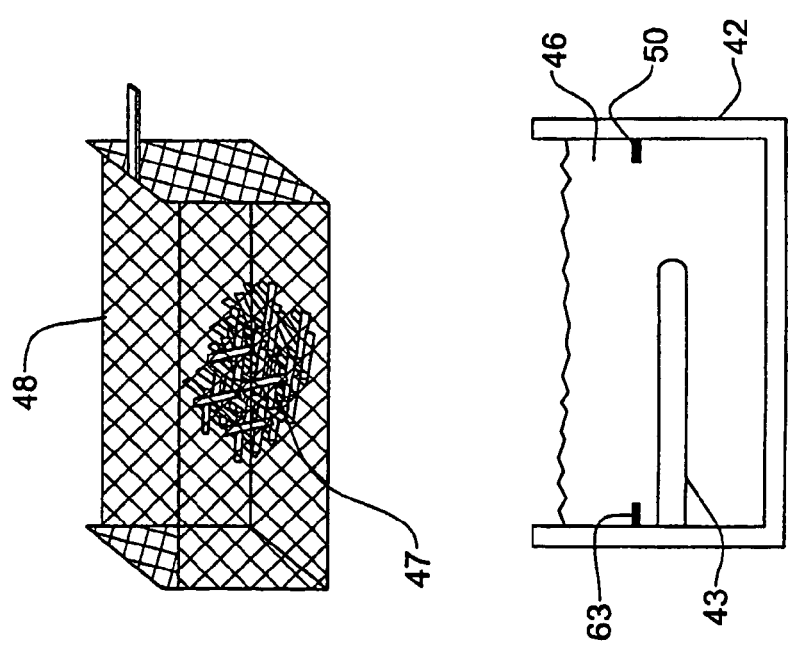

FIG. 4 shows a frying system 40 in accordance with another embodiment of the invention. The system 40 comprises a frying tank 42 for frying food items 47 and a vacuum chamber 44 for deoiling fried food items. The frying tank 42 has an open top, so that cooking oil 46 in the tank is exposed to ambient air, and hence to atmospheric pressure. The frying tank 42 includes a heating element 43 for heating oil 46 in the frying tank 42. A wire mesh basket is used to contain food items 47 during the frying. The basket 48 is dimensioned to be received in the frying tank 42 so that food items 47 are in contact with the frying oil 46 when the basket 48 is received in the frying tank 42. When inserted into the frying tank 42, the basket 48 is supported by stops 50 extending from the walls of the frying tank 42. At the termination of the frying, the basket 48 may be removed from the frying tank 42.

The vacuum chamber 44 is provided with a hinged side door 52. The door is shown in its open position in FIG. 4 so as to expose an interior space 56. The interior space 56 includes a cylindrical frying drum 58 having a horizontal axis. The frying drum 58 is formed as a wire mesh basket.

In use, the door 52 of the vacuum chamber 44 is opened and the food items 47 after frying are placed in the frying drum 58. The door 52 is then closed. When the door 52 is closed, a hermetic seal is formed between the door 52 and the edge 60 of the interior space 56 by means of a sealing ring 63. The frying drum 58 is then made to rotate about its horizontal axis by means of an electric motor located outside the vacuum chamber (not visible in the perspective of FIG. 4). The motor has a spindle 65 that passes through a back wall 67 of the frying tank opposite the door 52.

The vacuum chamber 44 includes a vacuum pump 68 which removes air from the interior chamber 56 when the door 52 is closed causing excess oil to be leeched out of the fried food items 47, so as to deoil the food items 47. When deoiling is completed, operation of the vacuum pump 68 is terminated so as to vent the interior chamber 56 through the vacuum pump 68. The door 52 of the vacuum chamber 44 is then opened and the deoiled fried food items 47 are removed.

The invention claimed is:

1. A system for frying one or more food items, comprising:
   a frying tank having an interior chamber configured to receive the one or more food items, the frying tank having an open state in which the one or more food items may be introduced into the interior chamber or removed from the interior chamber, and a closed state in which the interior chamber is hermetically sealed, wherein air is initially present in the interior chamber when the interior chamber is hermetically sealed;
   a cooking oil vat;
   an adjustable cooking oil pump to pump cooking oil from the cooking oil vat;
   a first conduit comprising a first oil valve to conduct the cooking oil from the cooking oil pump to the interior chamber at a flow rate determined by the cooking oil pump pumping cooking oil through the first oil valve; and
   a second conduit to conduct at least a portion of the cooking oil from the interior chamber to the cooking oil vat at a drainage rate,
   wherein by adjusting the oil pump, the flow rate through the first conduit is adjusted to exceed the drainage rate through the second conduit in order to replace all of the air initially present in the interior chamber with a quantity of the cooking oil while the frying tank is in the closed state.

2. The frying system according to claim 1 wherein the frying tank is configured to remain in the closed state while the one or more food items are fried so as to prevent oxidation of the cooking oil.

3. The system according to claim 1 further comprising a vacuum pump connected to the interior chamber.

4. The system according to claim 1 wherein the cooking oil vat is configured to heat the cooking oil in the cooking oil vat.

5. The system according to claim 1 further comprising an oil filter for filtering the cooking oil circulating in the system.

6. The system according to claim 1 wherein the frying tank is configured to toss the one or more food items.

7. The system according to claim 6 wherein the interior chamber contains a container for containing the one or more food items, the container configured to rotate in the interior chamber so as to toss the one or more food items.

8. The system of claim 1, wherein the first conduit comprises a first pipe and a second pipe, said first pipe connecting the cooking oil pump to the second pipe, and said second pipe connecting the first pipe to the interior chamber.

9. A method for frying one or more food items, comprising:
   inserting the one or more food items into a frying tank having an interior chamber configured to receive the one or more food items, the frying tank having a door;
   closing the door of the frying tank, such that the interior chamber is hermetically sealed and air is initially present in the interior chamber;
   activating a cooking oil pump such that cooking oil is pumped from a cooking oil vat into the interior chamber at a flow rate;
   allowing at least a portion of the cooking oil to drain from the interior chamber into the cooking oil vat at a drainage rate, wherein the flow rate is greater than the drainage rate, whereby all of the air initially present in the interior chamber is replaced with a quantity of the cooking oil; and
   frying the one or more food items.

10. The method according to claim 9 wherein the cooking oil is maintained in a closed system during the frying of the one or more food items so as to prevent oxidation of the cooking oil.

11. The method according to claim 9 wherein
    a first conduit conducts the cooking oil from the cooking oil pump to the interior chamber; and a second conduit conducts the at least a portion of the cooking oil from the interior chamber to the cooking oil vat.

12. The method according to claim 9, further comprising removing the quantity of the cooking oil from the interior chamber when frying of the one or more food items is completed.

13. The method according to claim 12 further comprising subjecting the one or more food items to a vacuum after removing the quantity of the cooking oil from the interior chamber so as to de-oil the one or more food items.

14. The method according to claim 9 wherein the cooking oil vat is configured to heat the cooking oil in the cooking oil vat.

15. The method according to claim 9 further comprising filtering the cooking oil.

16. The method according to claim 9 further comprising tossing the one or more food items during the frying of the one or more food items.

17. The method according to claim 16 wherein the one or more food items are tossed by rotating a container containing the one or more food items.

18. The method of claim 11, wherein the first conduit comprises a first pipe and a second pipe, said first pipe connecting the cooking oil pump to the second pipe, and said second pipe connecting the first pipe to the interior chamber.

19. The method of claim 12, wherein removing the quantity of the cooking oil from the interior chamber comprises reversing a pumping action of the oil pump so as to pump the quantity of the cooking oil from the interior chamber into the cooking oil vat.

* * * * *